Inventor
Alexander A. Trombly
by Sturtevant, Mason & Porter
Attys

Aug. 18, 1936.  A. A. TROMBLY  2,051,758
MACHINE FOR TESTING CANS
Filed Nov. 8, 1933   11 Sheets—Sheet 2

Aug. 18, 1936.   A. A. TROMBLY   2,051,758
MACHINE FOR TESTING CANS
Filed Nov. 8, 1933   11 Sheets-Sheet 3

Inventor
Alexander A. Trombly
by Sturtevant, Mason & Porter
Attys.

Aug. 18, 1936.  A. A. TROMBLY  2,051,758
MACHINE FOR TESTING CANS
Filed Nov. 8, 1933  11 Sheets-Sheet 4
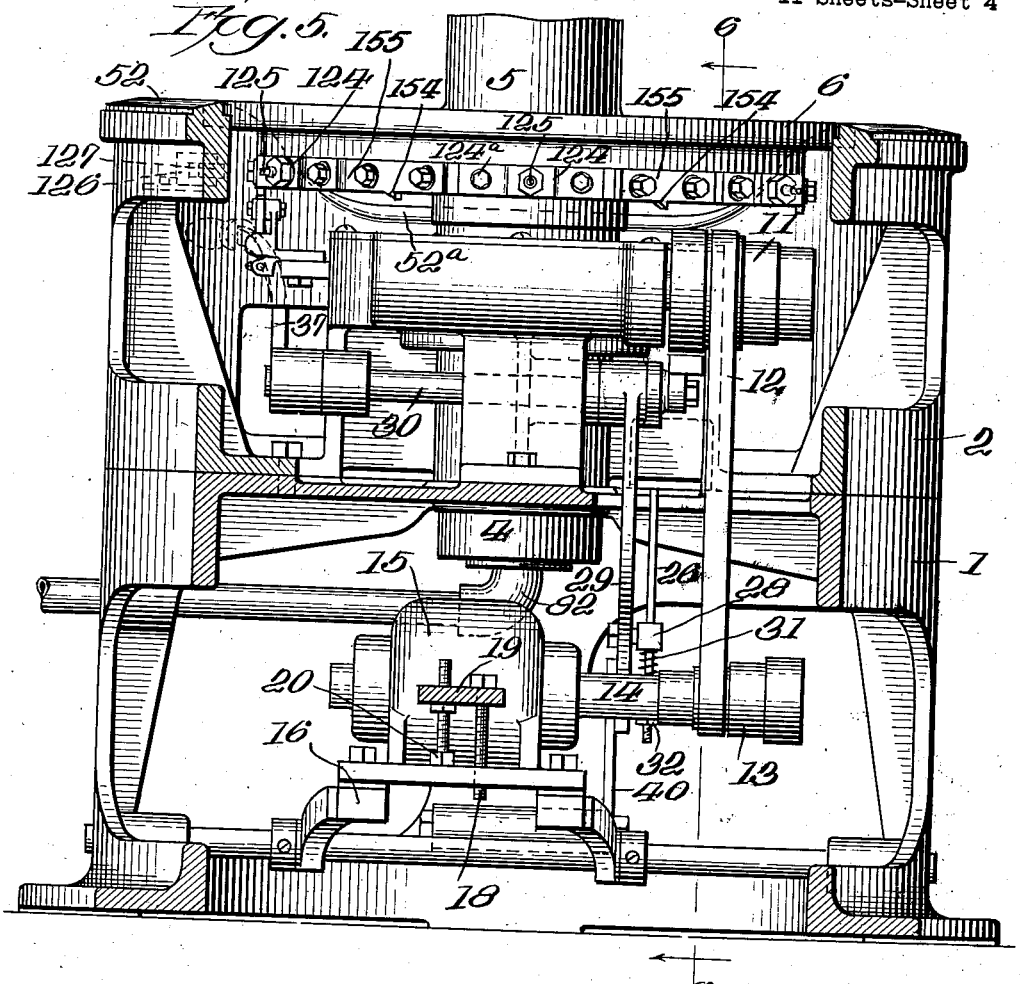
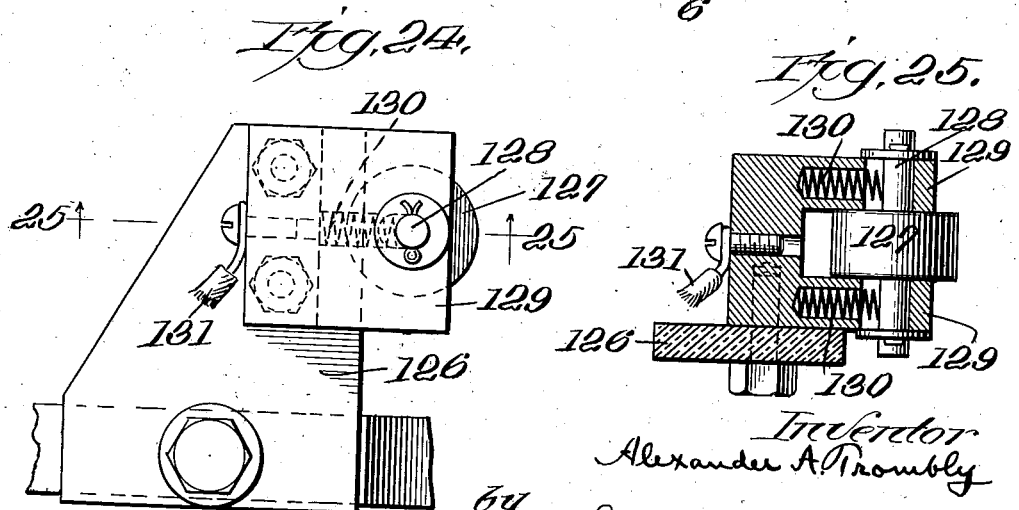

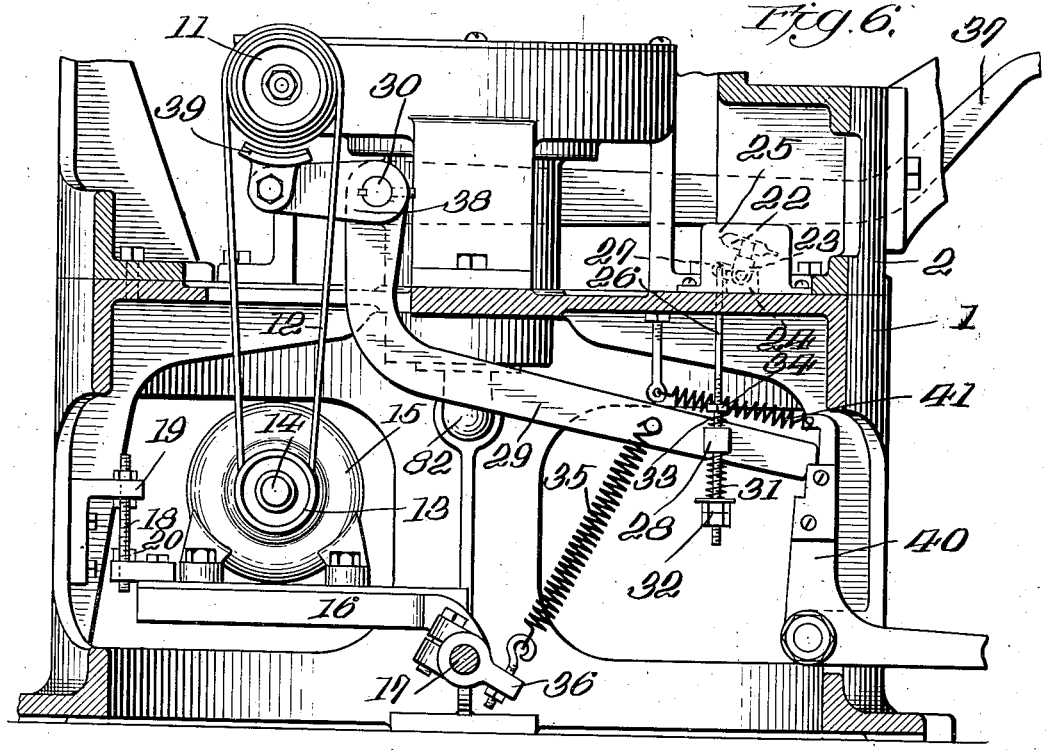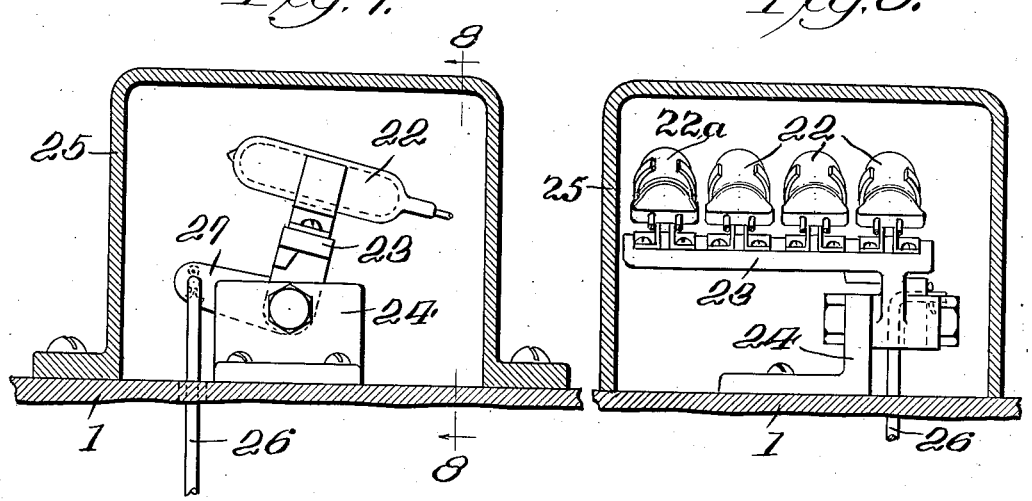

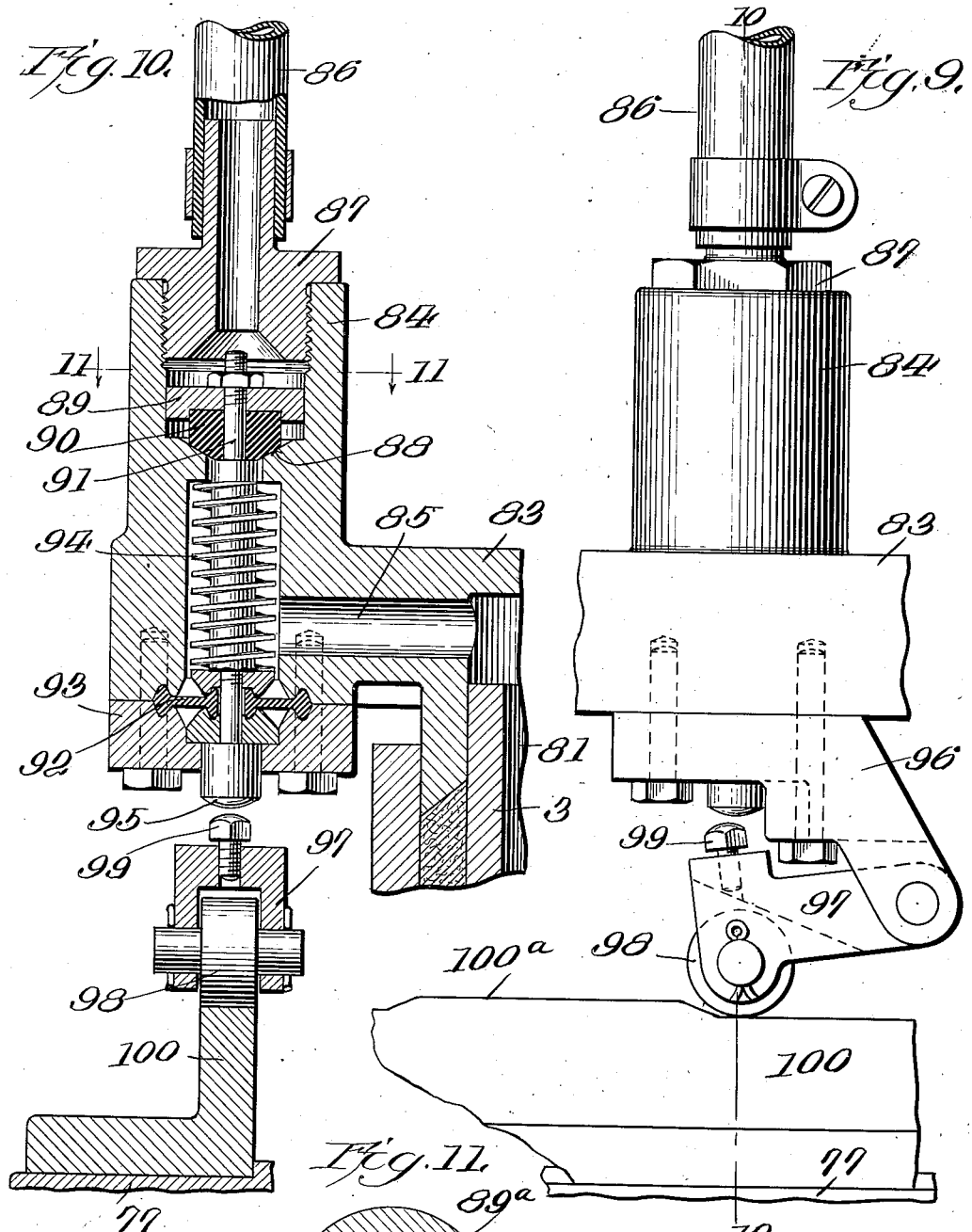

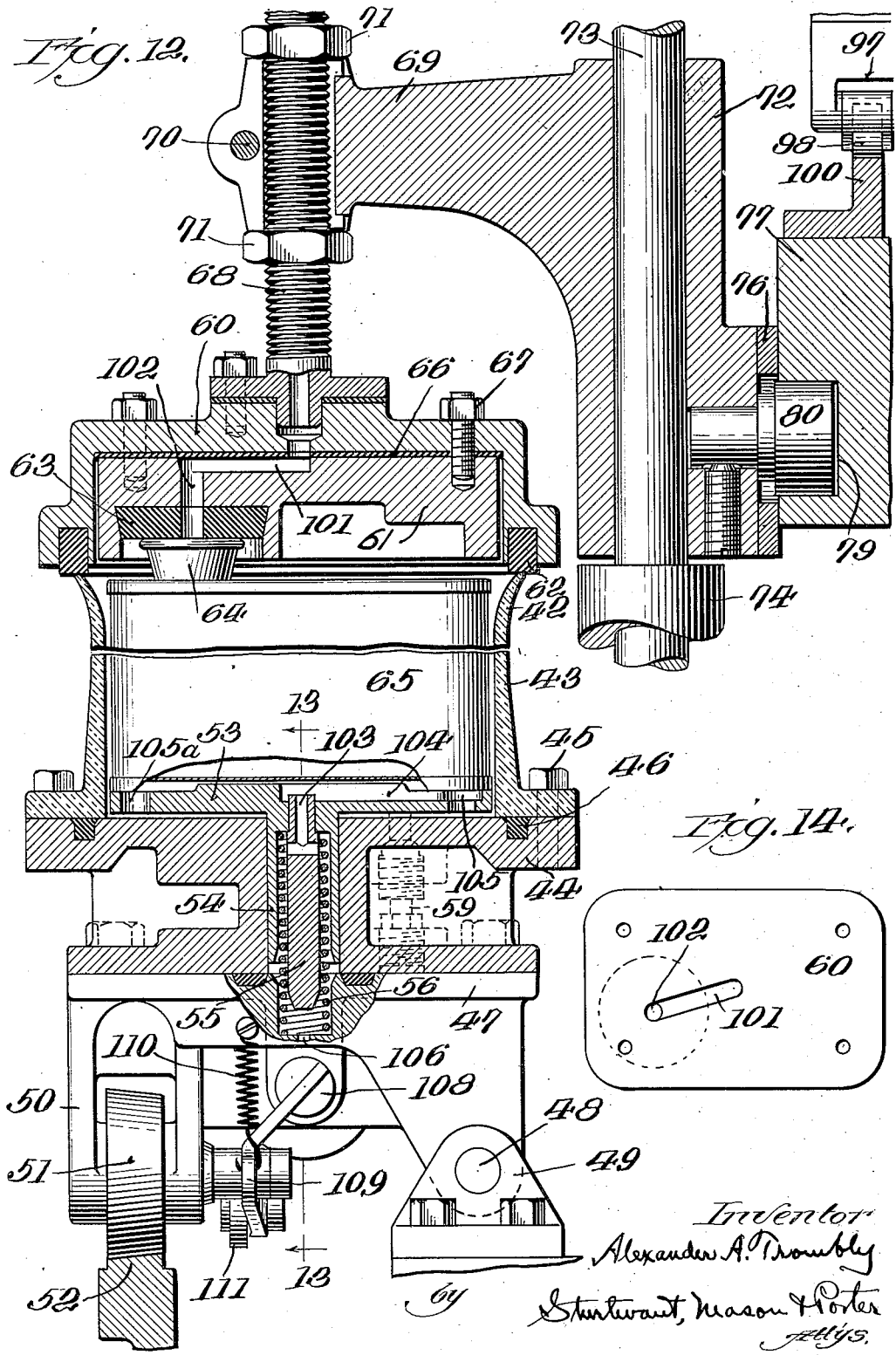

Aug. 18, 1936.   A. A. TROMBLY   2,051,758
MACHINE FOR TESTING CANS
Filed Nov. 8, 1933   11 Sheets-Sheet 8
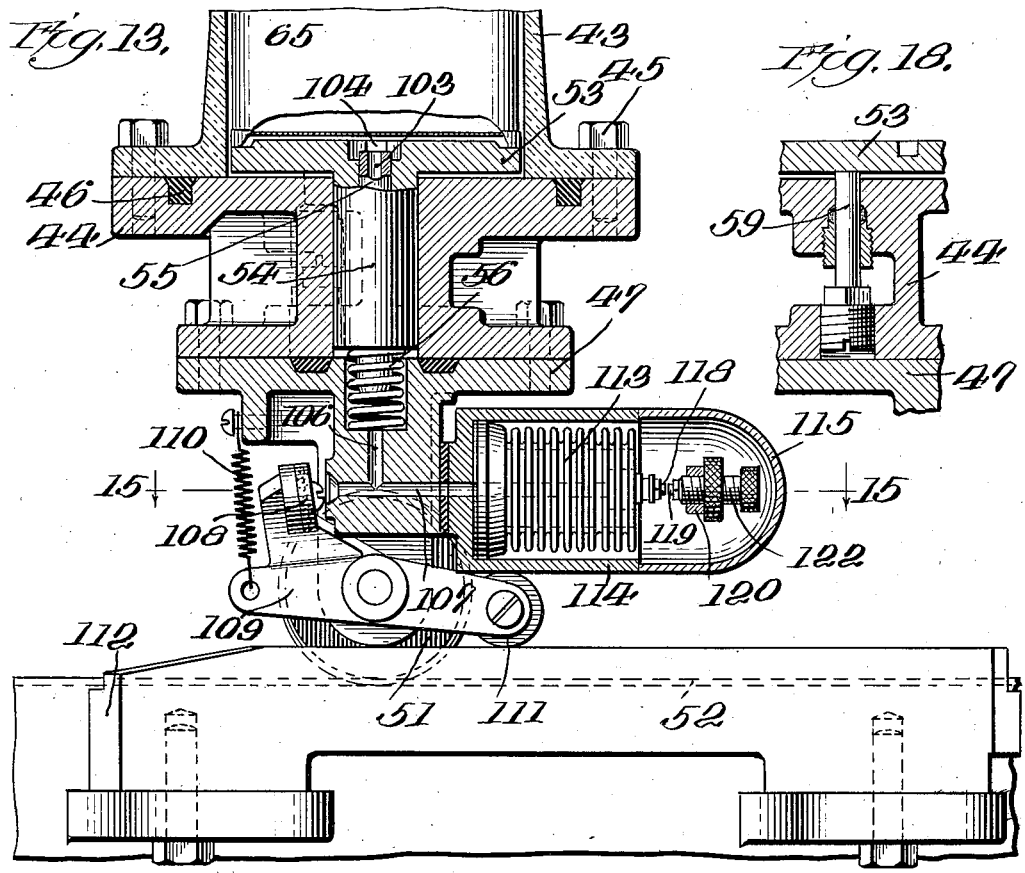
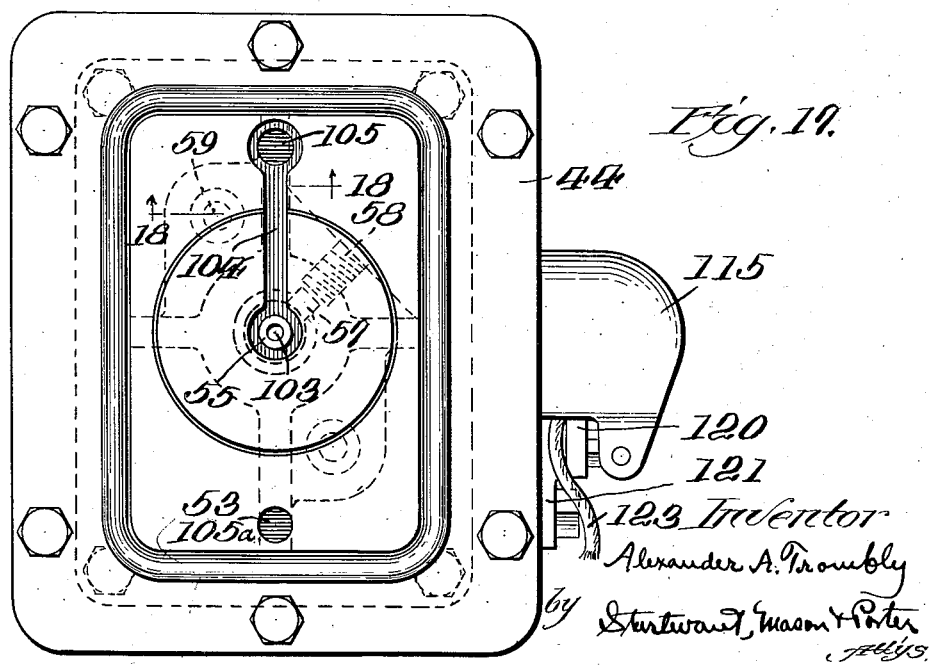

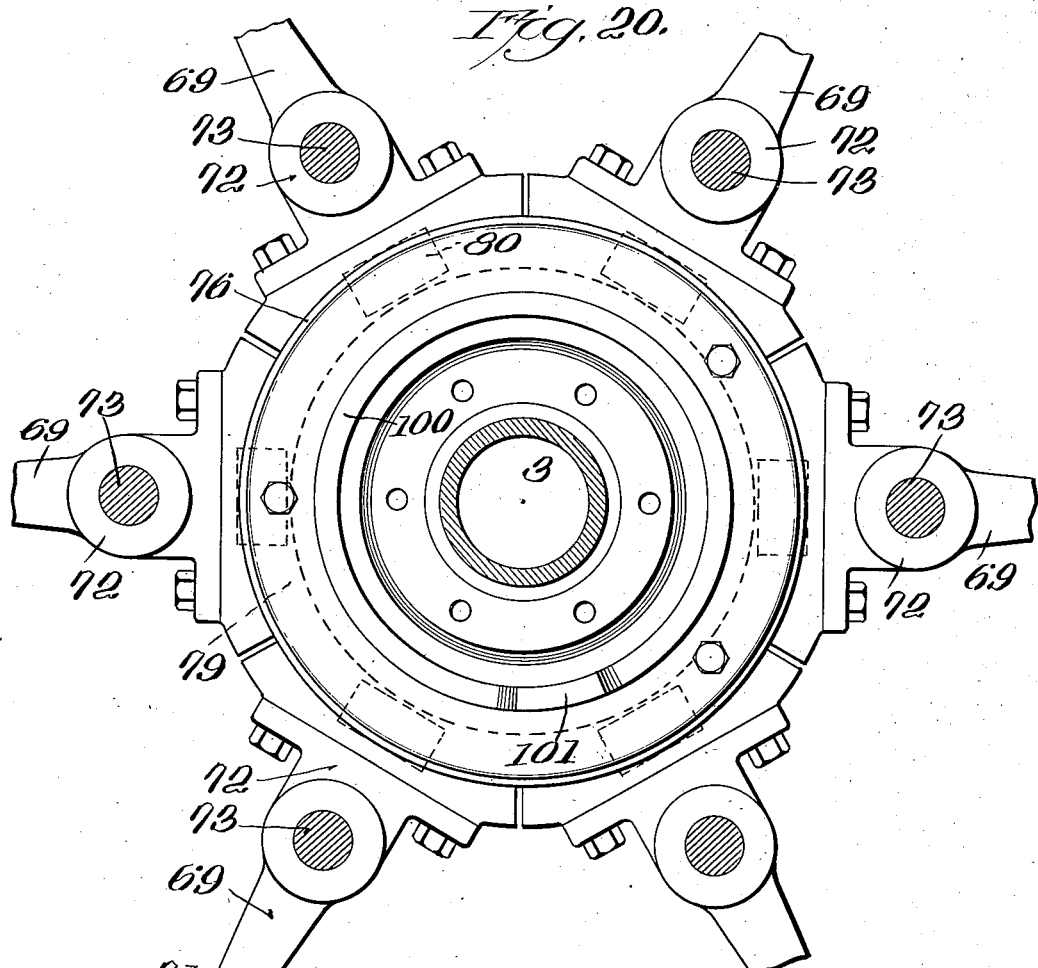
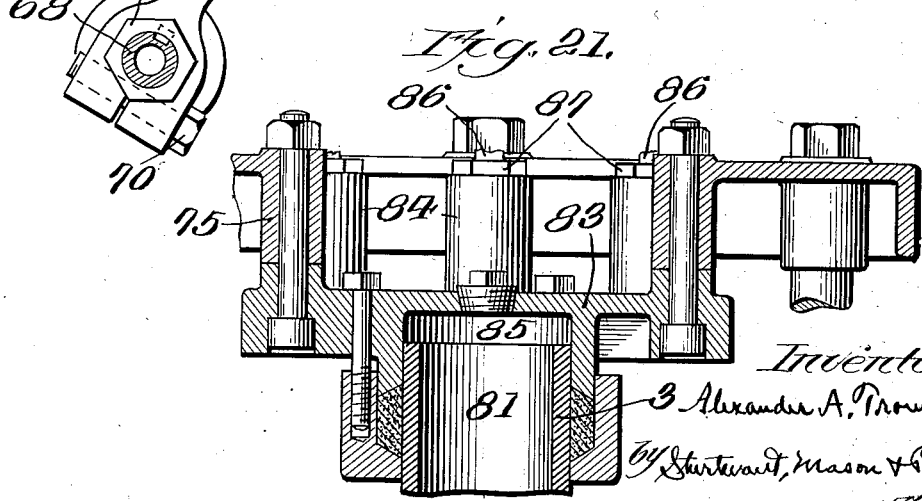

Aug. 18, 1936.　　　A. A. TROMBLY　　　2,051,758
MACHINE FOR TESTING CANS
Filed Nov. 8, 1933　　　11 Sheets-Sheet 11
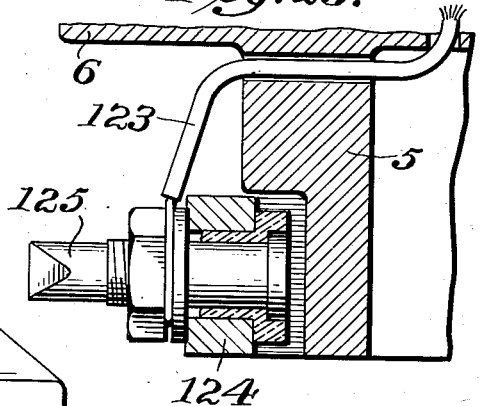
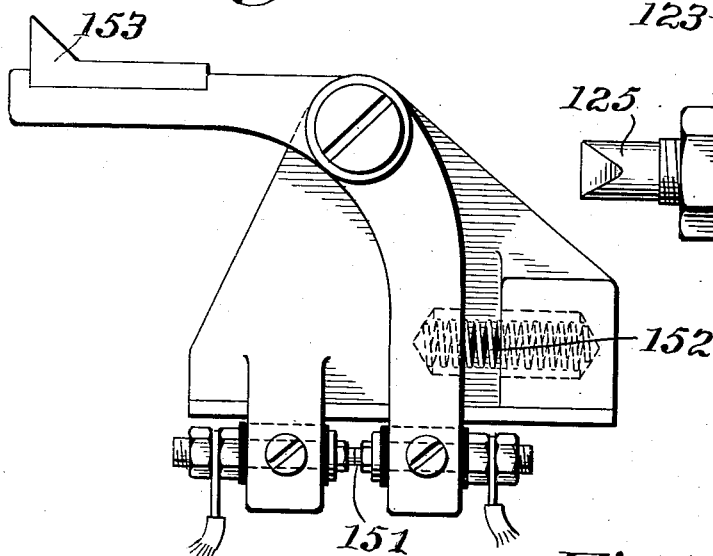
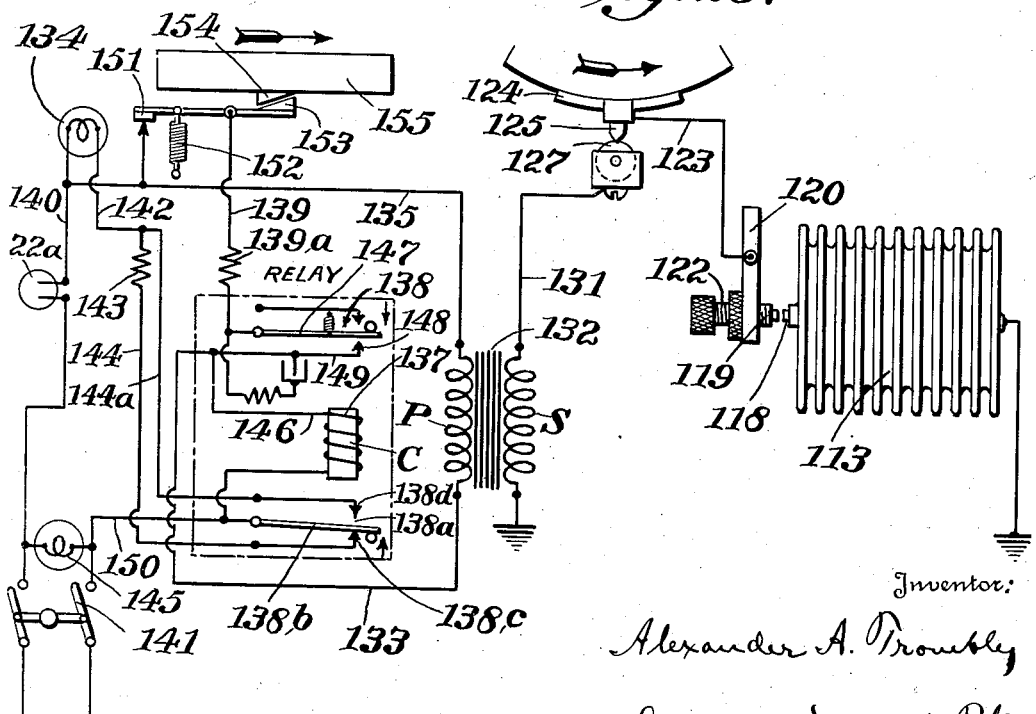
Inventor:
Alexander A. Trombly
By Sturtevant, Mason & Porter
Attorneys.

Patented Aug. 18, 1936

2,051,758

UNITED STATES PATENT OFFICE 2,051,758

MACHINE FOR TESTING CANS

Alexander A. Trombly, Chicago, Ill., assignor to Continental Can Company, Inc., New York, N. Y., a corporation of New York Application November 8, 1933, Serial No. 697,218

14 Claims. (Cl. 73—51)

The invention relates to new and useful improvements in a machine for testing cans for leaks.

An object of the invention is to provide a machine for testing cans for leaks having a plurality of testing units movable in succession past a loading and unloading station, with a single signalling device associated with all of the testing units and operating to indicate the condition of each can in succession as it approaches the unloading station.

A further object of the invention is to provide a machine of the above type wherein the signalling device is a lamp producing a dim light when the cans tested are perfect, and a bright light when a can being tested contains a leak.

A still further object of the invention is to provide a machine of the above type wherein each testing unit includes a chamber with an opening through which a can is placed in the chamber, a means for closing and sealing said opening, and independent means for venting the chamber until the opening is closed and sealed.

A still further object of the invention is to provide a testing machine of the above type wherein the chamber for receiving the can is mounted on a rotating turret, with which is associated means for placing the chamber in an inclined position for loading and unloading, and in a vertical position for testing.

A still further object of the invention is to provide a machine of the above type wherein the testing chamber is provided with a support yieldingly raised for receiving the can, which support is depressed by the closing means for the chamber so that the can is housed within the chamber for testing.

A still further object of the invention is to provide a testing machine of the above type wherein positive means limits the downward movement of said support so as to insure that the open end of the can will contact with the closing means and be tightly sealed for testing.

These and other objects will in part be obvious and will in part be hereinafter more fully disclosed.

In the drawings which show by way of illustration one embodiment of the invention—

Fig. 5 is a vertical sectional view of the lower or base portion of the machine taken on the line 5—5 of Fig. 4;

Fig. 6 is a sectional view on the line 6—6 of Figures 4 and 5;

Fig. 7 is a detail in section of the mercury switch controlling the motor;

Fig. 8 is a sectional view on the line 8—8 of Fig. 7;

Fig. 9 is a side view of the control valve for one of the testing units and the means for operating the same;

Fig. 10 is a vertical sectional view on the line 10—10 of Fig. 9;

Fig. 11 is a sectional view on the line 11—11 of Fig. 10;

Fig. 12 is a vertical sectional view on the line 12—12 of Fig. 2;

Fig. 13 is a sectional view on the line 13—13 of Fig. 12;

Fig. 14 is a top plan view of the inner section of the closing head for the testing station;

Fig. 17 is a top plan view of the testing chamber;

Fig. 18 is a sectional view on the line 18—18 of Fig. 17;

Fig. 20 is a sectional view on the line 20—20 of Fig. 1;

Fig. 21 is a transverse sectional view through the upper end of the central portion of the machine;

Fig. 22 is a detail of the switch and controlling lever therefor which is associated with the signalling device;

Fig. 23 is a vertical sectional view through the turret adjacent one of the testing stations and showing one terminal of a switch that travels with the testing station, which switch is associated with the signalling device;

Fig. 24 is a plan view of the other switch terminal which operates in succession with the switch terminal shown in Fig. 23;

Fig. 25 is a sectional view on the line 25—25 of Fig. 24, and

Fig. 26 is a diagrammatic view showing the wiring for the signalling circuit and the arrangement of the control devices therefor.

Figure 1:
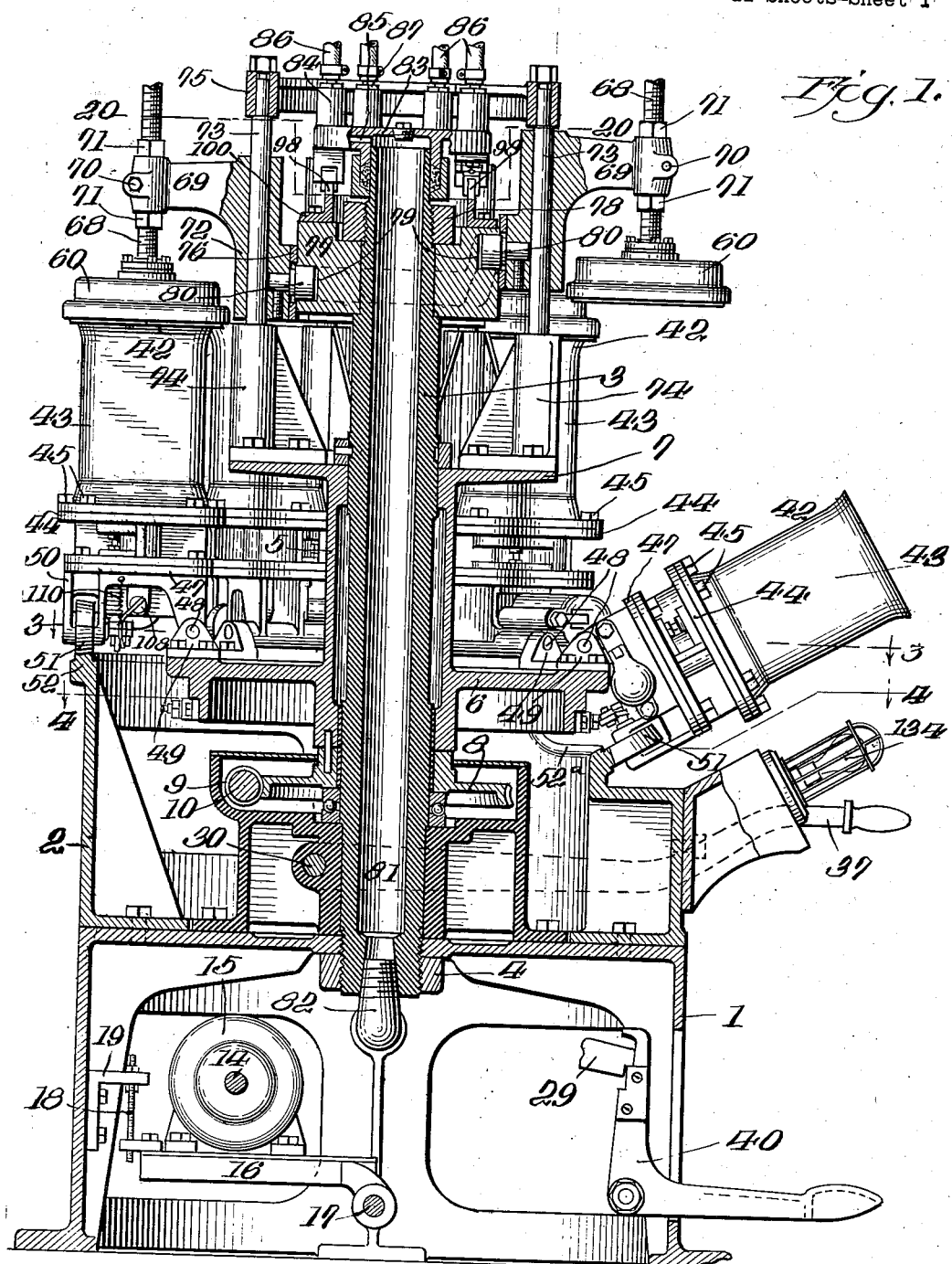
Figure 1 is a central vertical section through a machine embodying the improvements.
Figure 2:
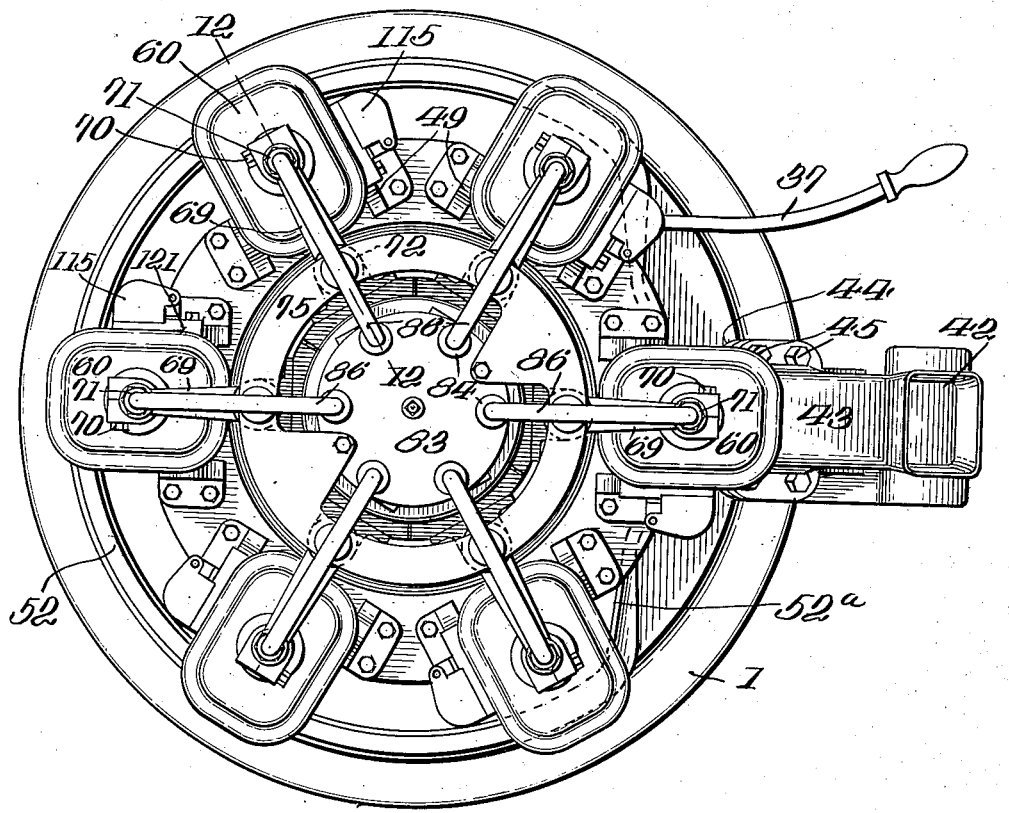
Fig. 2 is a top plan view of the same.
Figure 19:
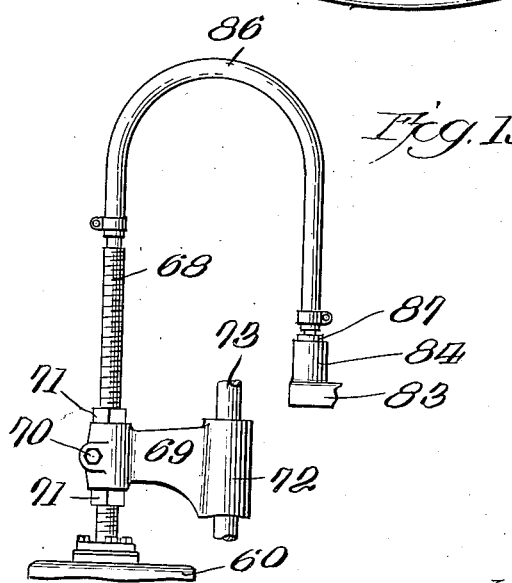
Fig. 19 is a side view of one of the supporting devices for the closing head and showing the pipe for leading air under pressure thereto.

The invention is directed to a machine for testing cans for leaks. The machine includes a supporting frame structure on which is mounted a rotating turret. The turret is preferably rotated continuously. Mounted on and rotating with the turret is a series of testing units, each of which includes a receptacle or chamber into which the can is placed for testing. Located within the chamber is a yielding support which is normally raised to receive the can. There is a means for closing the chamber or receptacle, and this presses the can downwardly into the chamber, and at the same time that the chamber is closed, the can is closed, leaving a relatively small space in the chamber about the can which is separated from the space within the can. Each chamber has an opening leading to the atmosphere and a valve for controlling the same, and the valve is open when the chamber and the can are being closed which will insure that the chamber about the can will be closed at atmospheric pressure, after which the can is subjected to air under pressure, and the valve is then closed. This occurs while the turret is traveling. If the can is a perfect can, without any leak, the chamber surrounding the can will remain at atmospheric pressure. If, however, the can leaks, then the chamber surrounding the can will have the pressure thereon increased above atmospheric pressure. Associated with each testing unit is a member which is shiftable when the pressure on the chamber rises above atmospheric pressure, and the shifting of this member closes the switch in the circuit which forms a part of a signalling device. This signalling device is so constructed that when the switch controlled by the pressure on the testing chamber of the unit is opened, the signalling system will not be affected, but will have a certain normal indication showing that the can has been tested and found to be perfect. When, however, the can is leaky, and the pressure on the chamber in which it is being tested rises above atmospheric pressure, then this switch is closed, and it will affect the signalling system as the testing unit approaches the unloading station, so that the signalling means will indicate a leaky can. The receptacles or chambers in which the cans are tested are so mounted on the turret that they may be swung to a vertical position or to an inclined position. This is accomplished automatically as the turret rotates. The receptacle is inclined at the loading and unloading station, so that the can which has been tested may be readily removed from the receptacle and the can to be tested substituted therefor.

It is thought that the invention will be better understood by a detailed description of the illustrated embodiment thereof. The machine includes a supporting frame structure which is in the form of a cylindrical supporting base 1 on which is mounted an upper frame structure 2. Fixedly secured to this supporting base 1 is a central column 3. The column 3 is threaded into the base at its lower end, and a lock nut 4 firmly clamps the column to the base. Mounted for rotation on the column 3 is a turret which is in the form of a sleeve 5 carrying a table 6 and a flange 7 which is spaced thereabove.

Keyed to the lower end of the sleeve 5 is a gear wheel 8 which meshes with a worm gear 9 on a shaft 10. The shaft 10 carries a plurality of belt wheels 11 over which a belt 12 runs. This belt in turn engages a corresponding belt wheel 13 on the shaft 14 of a motor 15. The belt can be shifted from one pulley to another for the purpose of varying the speed of rotation imparted to the turret by the motor. The motor 15 is mounted on a supporting base member 16 pivoted at 17, and supported by a threaded bolt 18. The bolt 18 extends through a right angle bracket 19 which is secured to the base 1 of the main supporting frame. The head of the bolt rests on the upper face of this angle bracket, and by turning the bolt, the supporting base 16 can be raised and lowered. There is a bolt 20 also threaded through the angle bracket and bearing against the upper face of the supporting base 16, and on this bolt is a lock nut. By manipulating these bolts, the supporting base may be raised or lowered for adjusting the tightness of the belt.

Figure 4:
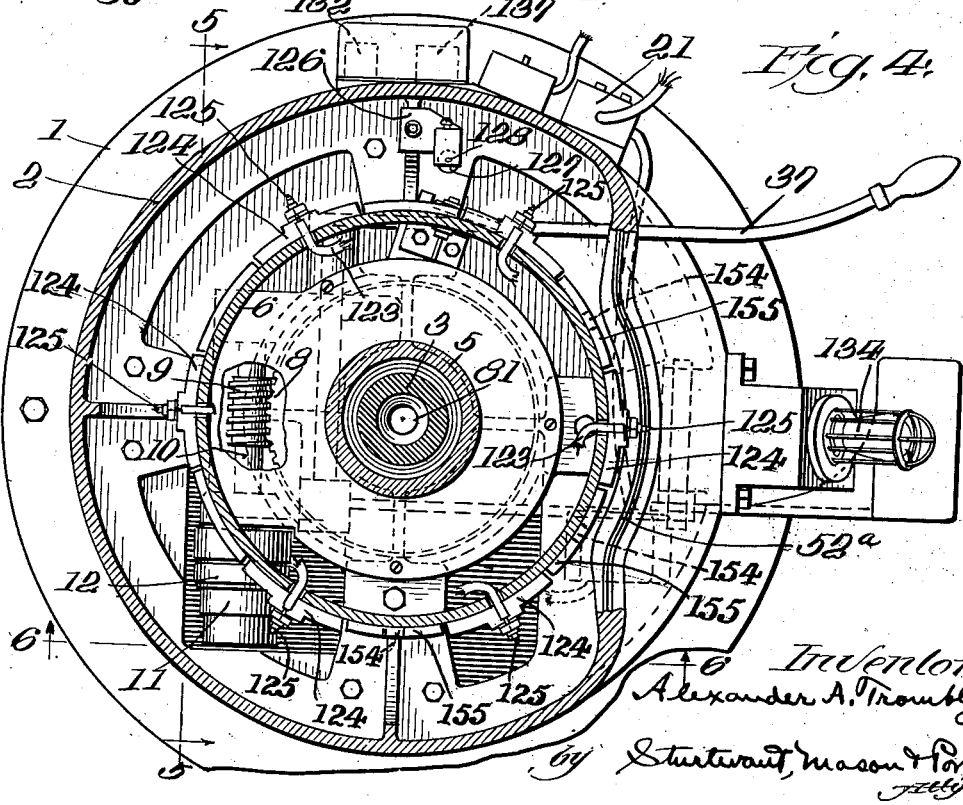
Fig. 4 is a horizontal sectional view on the line 4—4 of Fig. 1.

Mounted on the frame of the machine is a starting switch 21 (see Fig. 4). When this switch is closed, a circuit is established through the mercury switches 22 to the motor. The motor is a three-phase motor, and three mercury switches are provided for controlling the circuit thereof. These mercury switches are mounted on a supporting plate 23 which is pivotally supported on a bracket 24 attached to the frame of the machine. The mercury switch is enclosed within a casing 25. There is a rod 26 attached to the arm 27, and when this rod is raised so as to tilt the mercury switches to the position shown in Fig. 7, then the circuit leading to the motor is closed. The rod 26 extends through a lug 28 which is attached to an arm 29 carried by the shaft 30. There is a spring 31 on the rod beneath the lug 28. This spring bears against the lug and against stop nuts 32 threaded on to the rod. There is also a spring 33 above the lug 28 which bears against a stop nut 34 likewise threaded on to the rod. A spring 35 attached to the arm 29 and to an anchoring means 36 normally pulls downward on this arm 29. Attached to the shaft 30 is a hand lever 37 which extends to a point where it may be readily reached by the operator. Also attached to the shaft 30 is an arm 38 carrying a brake shoe 39. When the hand lever 37 is raised, it will release the brake shoe and raise the arm 29. This will also lift the rod 26 and tilt the mercury switch so as to close the circuit to the motor and thus the machine is started. There is a foot operated latch 40 pivoted to the supporting frame and projecting out through the base member, which is moved by a spring 41 into a position for holding the arm 29 raised. In this position of the arm 29, the switch remains closed and the brake released and the motor will continue to operate. The operator, however, upon releasing the hand lever 37 and also turning the latch 40 in a clockwise direction will release the arm 29 so that the spring 35 will pull down on the same, tilting the mercury switch so as to break the circuit, and lifting the brake shoe 39 for stopping the machine.

Figure 3:
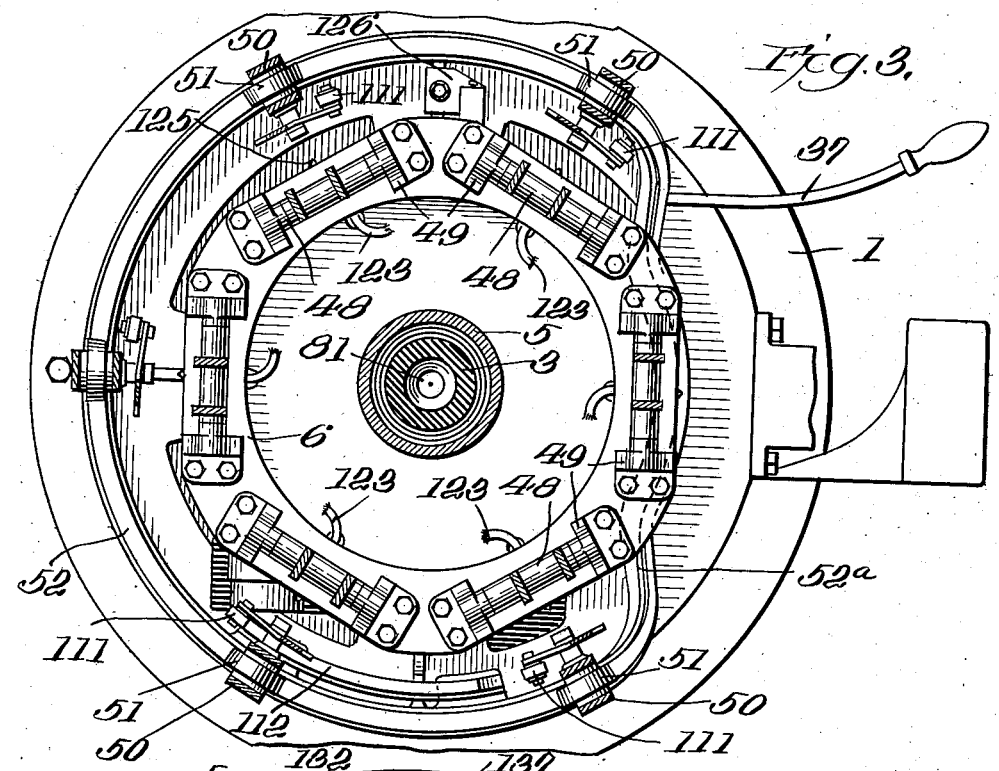
Fig. 3 is a horizontal section through the machine on the line 3—3 of Fig. 1, with the tilted testing receptacle or chamber removed.

Through the means described above, the turret is rotated continuously. Mounted on the turret and rotating therewith is a series of testing units, each of which includes a receptacle 42 in which the can to be tested is placed and housed. The receptacle is shaped to conform to the can, and one can only is placed in the chamber of the receptacle. The receptacle includes a body portion indicated at 43 which is preferably of porcelain, for the reason that the can which is to be tested is often decorated or lithographed, and when lowered into the receptacle, if it contacts with the inner wall thereof, it is less likely to be scratched, or the decoration, in any way, injured. This body portion 43 is secured to an adapter 44 by means of bolts 45. There is a gasket 46 between the adapter and the body portion of the receptacle, so that when said body portion is attached to the adapter, there is a sealed joint between the same. This adapter 44 carrying the body portion of the receptacle is in turn secured to a carrier 47. The adapter is secured thereto by suitable bolts. The carrier 47 is mounted on a pivot rod 48 journaled in upstanding lugs 49, 49 attached to the table member of the turret (see Figures 1, 3, and 12). The carrier 47 is also provided with a depending bracket 50 which carries a roller 51 running on a stationary cam rail 52. This roller and cam rail are so disposed that during a greater portion of the travel of the turret, the receptacle is in a vertical position. Said cam rail 52 is, however, shaped so as to permit the carrier to tilt downwardly and thus position the receptacle at an inclination to the vertical. This curved section of the cam rail which tilts the carrier is indicated at 52a, and in Fig. 1, the carrier which is supported by this section 52a is shown as tilted with the receptacle inclined to an angle of substantially thirty degrees. This position of the receptacle is referred to as the loading and unloading position. The can to be tested may be readily slipped into the receptacle and removed therefrom after it is tested. It is understood that after the can is slipped into the receptacle, the carrier is moved back to a righted position, placing the receptacle in a vertical position and the receptacle remains in this position while the can is being tested, and then returns again to a tilted position for the removal thereof.

Figure 16:
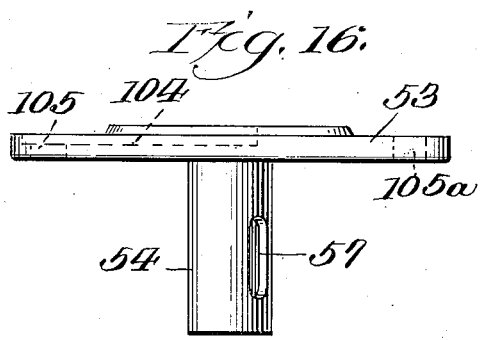
Fig. 16 is a side view of the supporting plate located within the testing chamber in which the can rests.

Located within the receptacle is a supporting plate 53. Said supporting plate is carried by a sleeve stem 54 sliding freely in a central recess in the adapter 44. Attached to the sleeve stem 54 is a central pin 55. Surrounding this pin is a spring 56. The carrier is recessed to receive this spring 56. The spring normally lifts the support in the receptacle to its extreme raised position. There is a slot 57 in the sleeve stem 54 (see Fig. 16), and the screw 58 shown in broken lines in Fig. 17 has the nose end extending into this slot 57. This screw serves to limit the upward movement of the supporting plate 53. When the can is placed in the receptacle for testing, it contacts with this support, and unless the support is forced down to its lowest position, the upper portion of the can will project from the receptacle. This greatly aids in the placing of the can in the receptacle and also in removing the can from the receptacle after the testing operation.

It is desirable to limit the downward movement of the support 53 when the can is forced into the receptacle and the receptacle closed. This is accomplished by means of adjustable pins 59 carried by the adapter and extending through the same and contacting with the under side of said support 53. The receptacle is closed by a head formed with an outer section 60 and an inner section 61. Said outer section carries a rubber gasket 62 which contacts with the extreme upper edge of the receptacle. The inner section of the head contacts with the can. As shown, said inner section is provided with a gasket 63 which contacts with the nozzle 64 of a can 65 placed in the receptacle for testing (see Fig. 12). Between the inner and outer sections of the head is a sealing disk 66 and bolts 67 secure the sections together. When the head is lowered, it contacts first with the receptacle and depresses the support 53 until it contacts with the limiting pins 59. These pins are so positioned that there is a tight sealing contact between the gasket 63 and the nozzle 64 before the gasket 62 contacts with the upper end of the receptacle and makes a sealed tight engagement therewith.

The closing head is attached to a pipe 68 which is threaded and which extends through an arm 69. The pipe is keyed to the arm so that it cannot rotate in the arm, and is clamped to the arm by a clamping bolt 70. Nuts 71, 71 threaded on to the pipe permit said pipe to be shifted in the arm. This provides a very simple means for adjusting the position of the closing head relative to the arm 69 on which it is mounted. The arm 69 is carried by a sleeve member 72 which slides freely up and down on a supporting rod 73. It is understood that there is a closing head for each receptacle, and also an arm similar to the arm 69 associated with each closing head. The supporting rod 73 is mounted in a bracket 74 which is bolted to the flange 7 of the rotating turret so that the supporting rod 73 rotates with the carrier for the receptacle in which the can is tested. The upper end of the supporting rod 73 is secured to a plate 75, which plate is attached to the supporting rod for each testing unit. The inner face of the sleeve member 72 is provided with projecting flanges and bolted to these flanges is a wear plate 76. Said wear plate bears against the outer face of a stationary cam 77 which is attached to the column 3. Said stationary cam rests against a shoulder on the column and is clamped thereagainst by a threaded nut 78. This stationary cam is provided with a cam race 79. Attached to each sleeve member 72 is a roller 80 which runs in this cam race in the stationary cam 77. As the turret rotates, the sleeve member 72 will be moved up and down on the supporting rod 73 therefor, and this will move the closing head into engagement with the receptacle and the can therein. This cam race 79 is so shaped that said closing head moves down on to the receptacle after it is returned to righted position for closing the same for testing the can, and after the can is tested, it is then raised therefrom, so that the carrier for the receptacle may be tilted to position the same for loading and unloading, as shown in Fig. 1.

The column 3 is hollow for the purpose of providing a port through which air under pressure is supplied to the cans for testing. This port is indicated at 81. Threaded into the lower end of the column is a coupling 82 which is connected to a pipe leading to a suitable source of air supply.

The upper end of the column is closed by a cap plate 83. This cap plate has a depending sleeve which receives the upper end of the column and a suitable packing gland is provided so that the cap plate 83 may turn on the column, but at the same time have a tight sealed engagement therewith. Secured to the cap plate 83 are a series of sleeves 84, one for each testing unit. These sleeves 84 have ports leading therethrough which connect with radial ports 85 that are in turn connected with the central port 81 through the column. Attached to each sleeve 84 is a flexible pipe 86 which is also in turn connected to the threaded supporting pipe 68 which carries the head and closes the receptacle and the can. Threaded into the upper end of the sleeve 84 is a ported nipple 87 to which this flexible pipe 86 is connected. The sleeve 84 is provided with a ported partition on the upper face of which is a valve seat 88. A disk 89 slides freely in the recess above the valve seat and carries a valve 90 which is adapted to engage the seat. This disk 89, as shown in Fig. 11, has flat sides 89a which permit the air to pass the disk. The stem 91 to which this disk and valve are attached extends down through the ported partition, and is connected to a diaphragm 92. The diaphragm is clamped between a head 93 and the lower end of the cap plate 83. There is an airtight connection between this stem and the diaphragm, and the diaphragm has an airtight connection with the cap plate 83. A spring 94 normally holds the valve seated and cuts off the supply of air to the testing chamber. On the lower end of the stem 91 is a rounded head 95. Attached to the under side of the cap plate 83 is a bracket 96. Pivotally mounted in this bracket is an arm 97 carrying a roller 98. Said arm carries an adjustable bolt 99 with a rounded head which is adapted to be lifted into contact with the rounded head of the valve stem for opening the valve. The roller 98 runs on the stationary cam 100. This stationary cam 100 is bolted to the upper face of the stationary cam 77. The cam 100 has a section thereof 100a which is raised, and this is so disposed that at a certain time in the rotation of the turret, the valve of each of the testing units will be opened in succession and allow air to pass through into the can in the closed testing chamber. This occurs after the can has been placed in the chamber and the chamber closed. The air is above atmospheric pressure, and after the can has been charged, then the valve is closed.

The section 61 of the closing head is provided with a radial port 101 (see Figures 12 and 14). This radial port connects with a port 102 leading through said section 61 and through the gasket 63 so that air under pressure is placed in the can, but the pressure of the air surrounding the can is not changed unless there is a leak in the can so that the air may escape through the leak into this chamber surrounding the can. The supporting plate 53 is provided with an opening centrally thereof in which the pin 55 is inserted. This pin has a port 103 extending vertically into the same, and then laterally so that the recess surrounding the pin in which the spring 56 is located, is connected with the chamber above the supporting plate 53. There is also a radial recess 104 extending from the center of the plate to a position well out toward the periphery of a plate, and there is an opening 105 through the plate leading to this radial recess. There is also another opening 105a through the plate. This provides a connection between the chamber surrounding the can and the recess surrounding the pin 55. There is a port 106 leading from the recess surrounding the spring downwardly into the carrier (see Fig. 13). This port connects with a right angle port 107 which is open at the left-hand end thereof. A valve 108 carried by a lever 109 closes the end of the port. A spring 110 normally holds the valve closed. A roller 111 running on a cam rail 112 operates to open the valve. This cam rail 112 is relatively short (see Fig. 3) and is disposed so that the roller will contact therewith during a portion only of the rotation of the turret. The valve is open when the roller is in contact with this section, and is timed so as to open when the closing head moves down on to the receptacle 43. The purpose of this open port is to insure that the chamber is closed at atmospheric pressure. After the head makes sealing contact with the can and the receptacle, then this air vent controlled by the valve 108 is closed. If there is no leak in the can, the chamber will remain at this atmospheric pressure. If, however, there is a leak in the can, the air under pressure will escape through the leak into the outer chamber which is now closed and raise the pressure therein above atmospheric pressure.

Figure 15:
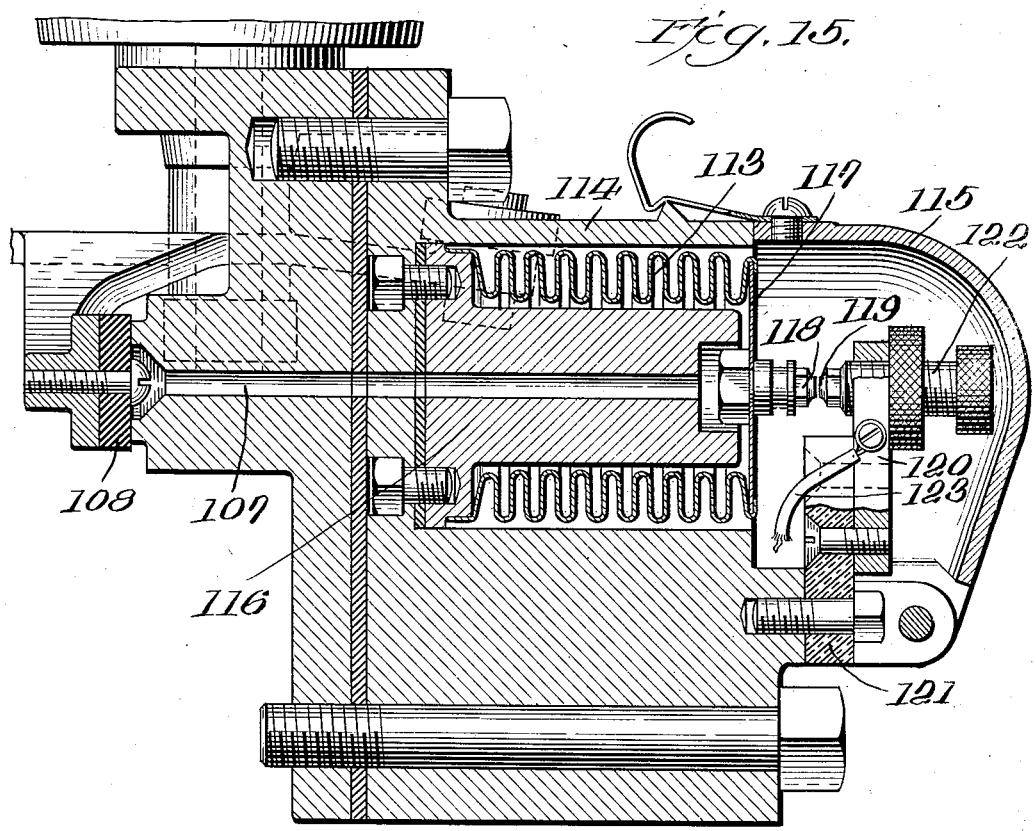
Fig. 15 is a sectional view on the line 15—15 of Fig. 13.

The port 107 leads to a Sylphon bellows 113 which is of the usual construction. This bellows is located in a casing 114 closed by a cap plate 115 (see Figures 13 and 15). There is a central filler core 116 within the bellows so that there is comparatively small space in the bellows to receive air. When the valve 108 is open, then the interior of the Sylphon bellows is at atmospheric pressure. After the valve is closed, the pressure within the chamber in the Sylphon bellows will vary with any change in pressure on the chamber within the receptacle 43. The exterior of the Sylphon bellows is subjected to atmospheric pressure, and therefore, if the pressure within the bellows increases above atmospheric, then the end wall 117 thereof will be caused to deflect or bulge outwardly as viewed in Figures 13 and 15. Fixed to this wall 117 is an electric contact point 118. Associated with this contact point 118 is a contact point 119 carried by an arm 120 mounted on a block 121 made of insulating material. The contact point 119 is carried by a threaded member 122 provided with a knurled head whereby it may be adjusted and a knurled lock nut serves to hold it in adjusted positions. A wire 123 is connected to this contact point 119 and when the contacts are in engagement, then this end of the wire 123 will be grounded (see Fig. 26). It is understood that there is one of these Sylphon bellows associated with each testing unit. Also associated with each testing unit and mounted on the turret for rotation therewith is a segment 124 (see Fig. 5). These segments are bolted to the turret by suitable bolts 124a. Mounted on each segment is a contact point 125. Said pin is insulated from the segment. The wire 123 is connected to this pin.

Mounted on the frame of the machine is a bracket 126 (see Figures 3, 4, 24, and 25). This bracket is made of insulating material. A roller 127 is mounted on a shaft 128 which is free to turn in the spaced yoke arms 129, 129 which are bolted to the bracket 126. Springs 130, 130 normally force the roller supporting shaft outward to the limit of its movement. A wire 131 is connected through the support to this roller. The pins 125 contact with the roller as they pass the same. Inasmuch as the roller can yield, the pin is of sufficient length so that it makes contact with the roller and for a brief interval of time will retain its contact and then will pass the roller. The wire 131 is connected to the secondary S of a transformer indicated at 132 in the drawings (see Figures 4 and 26). The other end of this secondary is grounded. When the terminals 118 and 119 are separated, the secondary circuit is broken. These terminals are separated whenever the chamber of a testing unit is open, or whenever a chamber of a testing unit is closed with a can therein containing air under pressure, provided said can is a perfect can and does not leak. When the pin 125 contacts with the roller 127, it will not close the secondary circuit unless the contacts 118 and 119 are closed, and this only occurs when there is a leaky can placing the Sylphon bellows under an air pressure greater than atmospheric pressure. It will be apparent, therefore, that as the turret rotates, the circuit of the secondary of the transformer 132 will only be closed in case there is a leaky can. It is understood that there is only one transformer, and the testing units are brought into operative relation thereto as the pin 125 associated with the testing unit contacts with the roller 127.

Associated with the transformer is a lamp which is so controlled by the transformer that it burns dimly when there is no can in the machine to be tested, showing that the electric system for indicating a leaky can is in perfect condition. The lamp also burns dimly if the can which is tested is perfect. When, however, the can which is tested is imperfect, then the lamp burns brightly for a period, so that the can may be classified when removed from the testing chamber as a leaky can. The lamp is indicated at 134 in the drawings. Said lamp is connected through a line 140 to a mechanically operated switch 141. The other terminal of the lamp is connected through a line 142 to a resistance 143 and a line 144 leading from the resistance through a switch 138a to the mechanically operated switch 141. The switch 138 is a double contact switch in which a movable member 138b contacts either with a terminal 138c to which the line 144 is connected, or with a terminal 138d with which a line 144a is connected. This line 144a is connected to the same terminal of the lamp as the line 144. When the movable switch member 138b is in contact with the terminal 138c, then the resistance is in circuit with the lamp and the lamp will burn dimly. When, however, this movable member 138b is in contact with the terminal 138d, then the resistance is cut out and the lamp will burn brightly. There is a second lamp 145 across the terminal of the circuit between the mechanically operated switch 141 and the lamp 134 which burns continuously, indicating that the system is connected to the source of current.

The movable member 138b of the switch 138a is controlled by a relay coil 137. The core C of the coil when energized will lift the movable member 138b causing it to engage the terminal 138d. When the circuit about the core is broken, then this movable member 138b will drop by gravity or through the action of suitable spring means so as to contact with the terminal 138c. The primary P of the transformer is connected from the line 135 to the line 140 leading to the current source. It is also connected through the line 133 with the line 146 which leads to the relay coil 137. The other terminal of the relay coil is connected to the line 150.

When the machine is first started, the contacts 118 and 119 are separated, as they are only closed by pressure developing on the Sylphon bellows which is derived from air escaping through a leak in a can. Inasmuch as the secondary circuit is thus broken on the starting of the machine, it will serve as a choke preventing flow of current through the primary of the transformer, and inasmuch as the coil of the relay is not energized, the movable member 138b will contact with the terminal 138c and the lamp circuit will be through the resistance 143 and the lamp will burn dimly. In case the can being tested is free from leaks, then there will be no pressure developing on the Sylphon bellows, and the contacts 118 and 119 will remain open. This maintains the secondary of the primary broken, and it will not be closed when the contact 125 engages the roller 127. The secondary will continue to choke the current through the primary and the lamp will continue to burn dimly.

When, however, a can which has a leak therein is tested, pressure of the air escaping through the leak into the Sylphon bellows closes the contacts 118 and 119, and when the contact 125 engages the roller 127, a circuit through the secondary will be established so that it will no longer choke the flow of current through the primary. The current flowing through the primary of the transformer will also flow through the coil 137 of the relay energizing the core C and lifting the member 138b and this will cut out the resistance 143 so that the light will burn brightly. Just as soon as the contact 125 leaves the roller 127, the secondary circuit will be opened, although the contacts 118 and 119 remain closed. The secondary will again operate as a choke on the current flowing through the primary of the transformer. This would release the movable member 138b and cut the resistance again into the lamp circuit. In order that this time interval, wherein the lamp burns brightly, indicating a leak, may be extended, a means is provided for maintaining the coil 137 energized and the movable member 138b lifted. This means includes a switch 151 placed in the line 139 in which there is a resistance 139a. The line 139 is connected to the movable member 147 of the switch 138. Said movable member 147 is normally raised by means of a spring into contact with the stop so that the switch is opened. When the relay coil 137 is energized, the core C will draw the movable member 147 downward into contact with the terminal 148, and this terminal is connected to a line 149 which is connected to the line 146 leading to the coil 137. When, therefore, the switch 151 is closed and the movable member of the switch 138 in contact with the terminal 148, there will be a source of current supply through the coil 137 which is independent of the current supply through the primary of the transformer. The leaky can established a current through the primary of the transformer which energized the relay coil and closed this switch 138, thus establishing this auxiliary supply of current through the relay. The resistance 139a in this circuit line is greater than the resistance offered to the flow of the current through the primary when it is free from the choking effect of the secondary coil, and therefore, the relay coil is energized by the supply of current through the primary when the secondary is closed. The opening of the secondary does not cut off the auxiliary supply of current, and it continues to energize the relay coil, holding the movable switch member 138b raised and the lamp resistance cut out so that the lamp will continue to burn brightly.

The switch 151 is controlled by a lever having a cam block 153 on the outer end thereof (see Figures 22 and 26). A spring 152 operating on the lever normally holds the contacts closed. Between the segments 124 are located segments 155 which are secured to the turret in a manner similar to the securing means for the segments 124. Each segment 155 carries a cam 154 which contacts with the cam block 153 on the lever, thus opening the switch 151. The opening of the switch 151 will cut off auxiliary current supply to the relay coil, and this will release the member 138b so that it will drop, cutting in the resistance to the lamp, and the lamp will then burn dimly. The contact member 125 first engages the roller 127, and after a short interval, then the cam member 154 opens the switch 151. During this interval, the lamp burns brightly indicating a leaky can. When the cam member 154 opens the switch 151, then the testing cycle is completed, the system restored to normal condition, and the lamp will burn dimly until another can testing unit comes into action.

A mercury switch 22a is provided in the line 140 which is so constructed that the circuit will be open, provided the machine should stop while the switch 151 is closed, or while the finger 125 is in contact with the roller 127. This breaking of the control circuit will prevent the burning out of the relay and transformer under the conditions just stated. The mercury switch 22a is mounted on the same supporting plate as the mercury switches 22 and is controlled through the rod 26 and arm 27.

It is not thought necessary to describe in detail the operation of the machine. The operator stands in front of the loading station and starts the machine with the hand lever 37. A can is placed in the receptacle and the receptacle, as the turret rotates, turns to a vertical position; the head comes down and closes the receptacle and the can. The air vent is then closed and the valve associated with the testing unit opened so as to permit air under pressure above atmospheric to pass into the can. The air is then cut off and the can is held under air pressure for a sufficient time while the turret is rotating to give opportunity to build up a pressure in the outer chamber of the testing unit, even though the leak is small. The chamber in the Sylphon bellows is of small capacity, and is very sensitive to any change in the pressure on the chamber surrounding the can. This chamber surrounding the can also compared with the chamber within the can is relatively small, and the leak, even though very small, will quickly change the pressure on the outer chamber and on the Sylphon bellows, thus closing the contacts controlled by the Sylphon bellows. Each testing unit as it approaches the unloading station will have the contacts 118 and 119 separated, if the can is perfect, and closed if the can is leaky, and this condition of the contacts operates through the system just described for causing the lamp to burn dimly if the can is perfect, or flashed to a bright condition, remaining bright for a brief interval of time, if the can is leaky. The operator, therefore, can quickly determine whether the can is a perfect, or a leaky can, and as it is removed from the receptacle, properly classify the same as to its condition.

While the machine described in detail is a semi-automatic machine, in that the operator loads and removes the cans by hand, it will be understood that certain features of the invention may be used in connection with testing machines of other types. While the lamp has been described in detail as an indicating device, it will be understood that other types of indicating devices may be used. It will also be understood that changes in the details of construction and the arrangement of the parts may be made without departing from the spirit of the invention as set forth in the appended claims.

Having thus described the invention, what I claim as new and desire to secure by Letters Patent, is—

1. In a can testing machine, the combination of a rotating turret, a series of can testing units carried thereby, each testing unit including a shiftable carrier, a loading and unloading station for said units, means operating in succession upon said carriers for shifting the same to an inclined position for loading and unloading, a signaling device associated with all of said testing units, and means operating thereon for indicating the condition of a can in a testing unit as said testing unit approaches said unloading station.

2. In a can testing machine, the combination of a rotating turret, a series of can testing units carried thereby, each testing unit including a shiftable carrier, a loading and unloading station for said units, means operating in succession upon said carriers for shifting the same to an inclined position for loading and unloading, a signaling device associated with all of said testing units, means for supplying said signaling device with current, and means for varying the current supplied to the signaling device when the can in the testing unit approaching the unloading station is a leaky can.

3. In a can testing machine, the combination of a rotating turret, a series of can testing units carried thereby, each testing unit including a shiftable carrier, a loading and unloading station for said units, means operating in succession upon said carriers for shifting the same to an inclined position for loading and unloading, a lamp located adjacent the loading station, a current supply for said lamp, and means whereby the current supply is varied when the can in the testing unit which has a leak therein approaches said unloading station.

4. In a can testing machine, the combination of a rotating turret, a series of can testing units carried thereby, each testing unit including a shiftable carrier, a loading and unloading station for said units, means operating in succession upon said carriers for shifting the same to an inclined position for loading and unloading, a lamp located adjacent the loading station, a current supply for said lamp, a resistance normally in said circuit whereby said lamp provides a dim light, and means controlled by the testing units in succession whereby when a can in a testing unit having a leak therein approaches said unloading station, said resistance will be removed from the circuit and the lamp will be caused to burn brightly.

5. In a can testing machine, the combination of a rotating turret, a series of can testing units carried thereby each including a shiftable carrier on which is mounted a receptacle adapted to enclose a can, a loading and unloading station for said units, means operating in succession upon said carrier for shifting the receptacle to an inclined position for loading and unloading, means for closing the receptacle and for closing the can, means for supplying the can with air under pressure, means responsive to the pressure of the air surrounding the can in the receptacle for controlling an electric circuit, a signaling device, and means influenced by the condition of the circuit of the testing unit for indicating at said signaling device the condition of the can in a testing unit as said testing unit approaches an unloading station.

6. In a can testing machine, the combination of a rotating turret, a series of can testing units carried thereby, a loading and unloading station for said units, each testing unit including a receptacle for enclosing the can to be tested, means for closing the receptacle and the can, means for supplying the interior of said can with air under pressure, a signaling device controlled by the pressure in the chamber surrounding the can in the testing unit, each of said units including a carrier for the receptacle pivoted upon said turret and a control cam means operable upon said carrier to shift the receptacle to an inclined position for unloading and loading and to a vertical position for testing.

7. In a can testing machine, the combination of a rotating turret, a series of can testing units carried thereby each including a receptacle for housing the can to be tested, and a shiftable carrier on which the receptacle is mounted, means for closing the receptacle and for closing the can in the closed receptacle, means for venting said receptacle, a valve for said venting means timed so as to hold said vent open until said receptacle is closed by the closing means and for subsequently closing said vent, means for supplying said can within the receptacle with air under pressure, a loading and unloading station through which said testing units pass in succession, means operating upon the carrier for shifting the same to an inclined position for loading and unloading, a signaling device associated with all of said units, and means responsive to the air pressure in the chamber of the testing unit surrounding the can for indicating the condition of the can in a testing unit as said testing unit approaches the unloading station.

8. In a can testing machine, the combination of a rotating turret, a series of can testing units carried thereby each including a receptacle having the upper end open to receive and house a can to be tested, a vertically movable support in said receptacle on which said can is placed, a spring for raising said support, a stop for limiting the movement of the support in an upward direction, whereby when said can is supported thereon, it will project from said receptacle, a closing head adapted to engage the can for forcing the same into the receptacle and closing the receptacle, and adjustable stops for limiting the downward movement of the support into the receptacle.

9. In a can testing machine, the combination of a rotating turret, a series of can testing units carried thereby each including a receptacle having the upper end open to receive and house a can to be tested, a vertically movable support in said receptacle on which said can is placed, a spring for raising said support, a stop for limiting the movement of the support in an upward direction whereby when said can is supported thereon, it will project from said receptacle, a closing head adapted to engage the can for forcing the same into the receptacle and closing the receptacle, adjustable stops for limiting the downward movement of the support into the receptacle, a vent opening leading from the chamber surrounding the can to the atmosphere, and a valve for closing said vent opening, said valve being timed to close the opening after the closing head has closed the receptacle, so as to insure that the receptacle will be closed with the air in the chamber surrounding the can at atmospheric pressure.

10. In a can testing machine, the combination of a rotating turret, a series of can testing units carried thereby each including a receptacle having the upper end open to receive and house a can to be tested, a vertically movable support in said receptacle on which said can is placed, a spring for raising said support, a stop for limiting the movement of the support in an upward direction whereby when said can is supported thereon, it will project from said receptacle, a closing head adapted to engage the can for forcing the same into the receptacle and closing the receptacle, adjustable stops for limiting the downward movement of the support into the receptacle, a vent opening leading from the chamber surrounding the can to the atmosphere, a valve for closing said vent opening, said valve being timed to close the opening after the closing head has closed the receptacle, so as to insure that the receptacle will be closed with the air in the chamber surrounding the can at atmospheric pressure, means for supplying said can with air under pressure, and means responsive to the pressure of the air in the chamber surrounding the can for indicating the condition of the can in the testing unit.

11. In a can testing machine, the combination of a rotating turret, a series of can testing units carried thereby each including a receptacle adapted to house a can to be tested, a support in said receptacle on which said can is placed, a spring for raising said support, a stop for limiting the movement of the support in an upward direction whereby when said can is supported thereon, it will project from said receptacle, a closing head adapted to engage the can for forcing the same into the receptacle and closing the receptacle, adjustable stops for limiting the downward movement of the support into the receptacle, a vent opening leading from the chamber surrounding the can to the atmosphere, a valve for closing said vent opening, said valve being timed to close the opening after the closing head has closed the receptacle so as to insure that the receptacle will be closed with the air in the chamber surrounding the can at atmospheric pressure, means for supplying said can with air under pressure, a loading and unloading station for said testing units, a signaling device associated with all of the testing units, and means responsive to the pressure of the air in the chamber surrounding the can being tested for indicating through the signaling device the condition of the can in the testing unit as said testing unit approaches said unloading station.

12. In a can testing machine, the combination of a rotating turret, a series of testing units carried thereby each including a pivoted carrier, an adapter secured to said carrier, a porcelain receptacle attached to said adapter and forming a chamber adapted to enclose a can for testing, a reciprocating head having a gasket adapted to engage and close said can and a gasket adapted to engage and close said receptacle; a stationary cam, and devices cooperating therewith for shifting said carrier so as to move said receptacle to an inclined position for loading and unloading and to a vertical position for testing.

13. In a can testing machine, the combination of a rotating turret, a series of testing units carried thereby each including a pivoted carrier, an adapter secured to said carrier, a porcelain receptacle attached to said adapter and forming a chamber adapted to enclose a can for testing, a reciprocating head having a gasket adapted to engage and close said can and a gasket adapted to engage and close said receptacle; a stationary cam, devices cooperating therewith for shifting said carrier so as to move said receptacle to an inclined position for loading and unloading and to a vertical position for testing, means for supplying the can with air under pressure, a signaling device associated with all of the testing units, and means responsive to the pressure of the air in the chamber surrounding the can being tested for indicating through said signaling device the condition of the can in the testing unit as said unit approaches the unloading station.

14. In a can testing machine, the combination of a rotating turret, a series of testing units carried thereby each including a pivoted carrier, an adapter secured to said carrier, a porcelain receptacle attached to said adapter and forming a chamber adapted to enclose a can for testing, a reciprocating head having a gasket adapted to engage and close said can and a gasket adapted to engage and close said receptacle; a stationary cam, devices cooperating therewith for shifting said carrier so as to move said receptacle to an inclined position for loading and unloading and to a vertical position for testing, means for supplying the can with air under pressure, each testing unit also including a Sylphon bellows connected to the chamber surrounding the can being tested, a contact point carried by said Sylphon bellows, a contact point cooperating therewith and positioned so that when the pressure in the chamber increases above atmospheric pressure, said contacts will be closed; a signaling device associated with all of said testing units, and means including a circuit controlled by said contact points and operable upon said signaling device for indicating the condition of the can in the testing unit as said testing unit approaches the unloading station.

ALEX. A. TROMBLY.